United States Patent [19]
Dyment et al.

[11] B 3,914,465

[45] Oct. 21, 1975

[54] SURFACE PASSIVATION OF GaAs JUNCTION LASER DEVICES

[75] Inventors: John Cameron Dyment, Chatham; Bertram Schwartz, Westfield, both of N.J.

[73] Assignee: Bell Telephone Laboratories, Incorporated, Murray Hill, N.J.

[22] Filed: Sept. 25, 1972

[21] Appl. No.: 292,126

[44] Published under the Trial Voluntary Protest Program on January 28, 1975 as document no. B 292,126.

[52] U.S. Cl. .................. 427/82; 29/588; 148/187; 357/52; 427/126; 427/162; 427/399
[51] Int. Cl.² ...................... H01I 1/34; H01S 3/19
[58] Field of Search ....... 117/118, 106 A, 200, 201; 29/569 L, 576, 588; 148/187; 357/52; 427/82, 126, 162, 399

[56] References Cited
UNITED STATES PATENTS

| | | | |
|---|---|---|---|
| 2,875,384 | 2/1959 | Wallmark | 117/200 |
| 3,260,626 | 7/1966 | Schink | 117/200 |
| 3,725,161 | 4/1973 | Kuper | 117/118 |

Primary Examiner—William D. Martin
Assistant Examiner—John H. Newsome
Attorney, Agent, or Firm—L. H. Birnbaum

[57] ABSTRACT

A method for protecting the surface of GaAs junction lasers, in particular the cleaved mirror surfaces of such devices. A native oxide is first grown on the surface of the device by immersing the device in an aqueous $H_2O_2$ solution wherein the pH is 1.5–3.5. The device is then immersed in an aqueous $H_2O_2$ solution which has been adjusted to a pH of 6–8 by a suitable hydroxide. This double oxidation technique provides substantial protection against the deleterious effects of water on the mirror surfaces.

10 Claims, 1 Drawing Figure

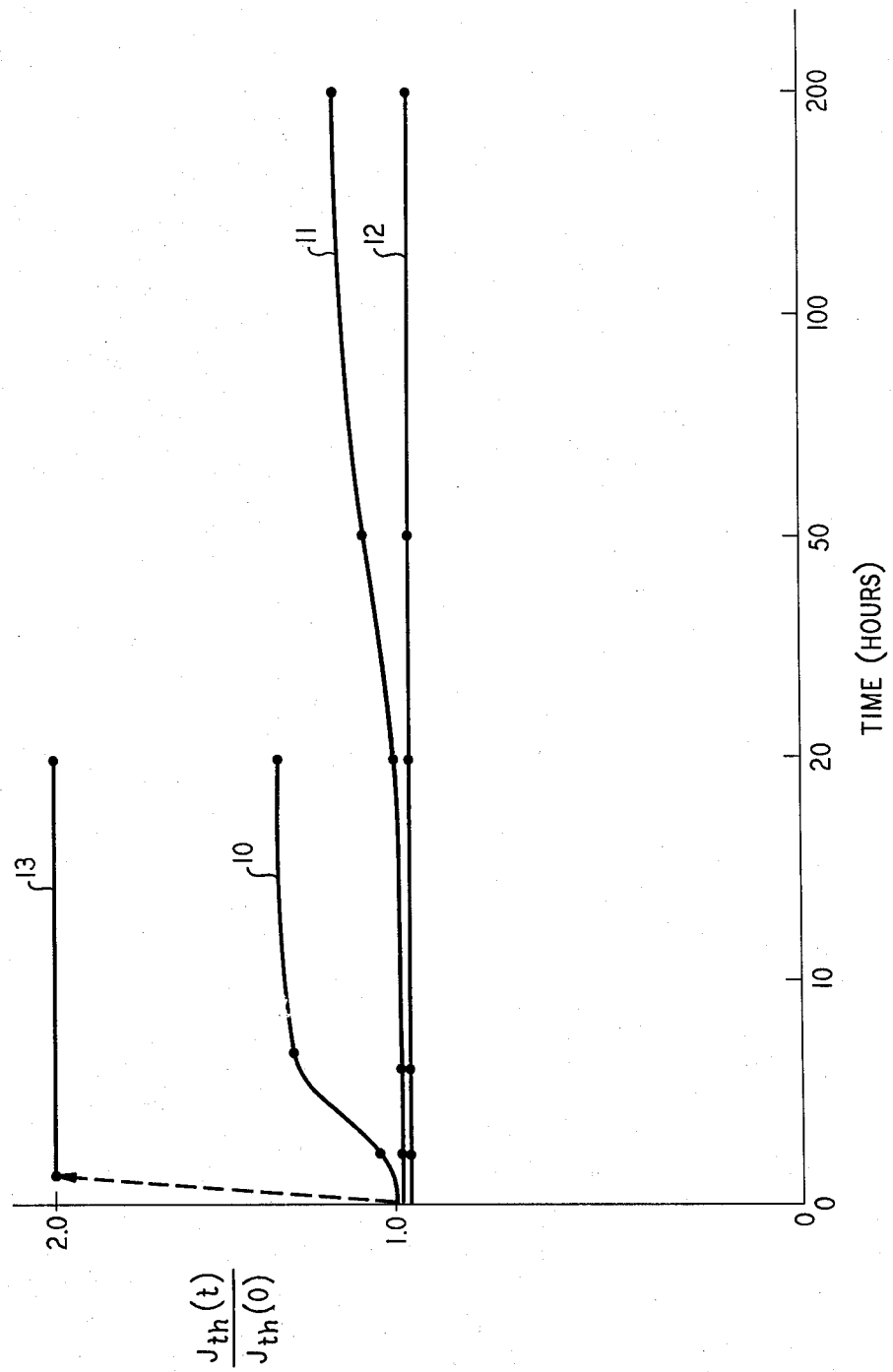

SURFACE PASSIVATION OF GaAs JUNCTION LASER DEVICES

BACKGROUND OF THE INVENTION

This invention relates to a method for protecting GaAs junction lasers against degradation due to the ambient, and in particular to a method for protecting the cleaved mirror surfaces of the devices from attack by water.

GaAs lasers are presently the subject of intensive studies and investigations for potential use in optical communications systems. Basically, these devices can be divided into two categories: the homostructure and heterostructure devices. The homostructure device consists primarily of a region of n-type GaAs adjacent to a region of p-type GaAs such that a single p-n junction is formed. In the basic single heterostructure device, a layer of p-type GaAs is sandwiched between a region of n-type GaAs and a region of p-type AlGaAs. Another form of heterostructure device, the double heterostructure laser, comprises an active layer of n or p-type GaAs sandwiched between a layer of n-type AlGaAs and a layer of p-type AlGaAs, with a region of n-type GaAs formed adjacent to the n-type AlGaAs and preferably a region of p-type GaAs formed adjacent to the p-type AlGaAs. The advantages of the double heterostructure are the improved confinement of the injected electrons which results in lower threshold current densities, and the improved optical confinement which results in light emission essentially only from the active region.

Lasing is made possible in both types of devices by cleaving two opposite surfaces of the device which are perpendicular to the p-n junction. These mirror surfaces internally reflect light produced by the device and thereby contribute to stimulated emission.

One problem associated with these devices has been their short lifetimes, usually of the order of a few hours at most. The precise mechanism of degradation is still unclear. However, it appears that at least one cause of the deterioration is the effect of water or water vapor on the mirror surfaces. It has been found, for example, that when GaAs lasers are exposed to water for 8 hours the mirror surfaces are severely roughened, resulting in a loss of reflectivity and consequently a sharp increase in threshold current.

It is therefore the primary object of the present invention to protect the mirror surfaces of GaAs junction lasers from attack by water in the ambient.

SUMMARY OF THE INVENTION

These and other objects are achieved in accordance with the invention which provides for a double oxidation of the surfaces of the device. The first oxidation is performed by immersion in an aqueous $H_2O_2$ solution with a pH of 1.5–3.5. The second oxidation is performed in an aqueous $H_2O_2$ solution wherein the pH has been raised to 6–8 by an appropriate hydroxide such as $NH_4OH$. It was demonstrated that devices which had been so treated were impervious to a water environment whereas untreated as well as singly oxidized devices showed marked degradation.

BRIEF DESCRIPTION OF THE DRAWING

These and other features of the invention will be delineated in detail in the description to follow. In the drawing:

The FIGURE is a graph of normalized threshold current as a function of time for four groups of lasers, one of which was treated in accordance with one embodiment of the invention.

DETAILED DESCRIPTION OF THE INVENTION

The process described herein is performed on any GaAs junction laser device. By this is meant any laser device employing one or more layers of GaAs and/or one or more layers of a substituted GaAs in a homostructure or heterostructure device. Thus, the inventive process may be applied to a device comprising $Z_xGa_{1-x}As$ where $x$ varies from 0 to 0.7 and where Z may be Al or In. (For a general discussion of such devices, see Panish and Hayashi, "A New Class of Diode Lasers," *Scientific American*, Vol. 224, No. 1, pp. 32–40 (July 1971).)

A completed double heterostructure device was first immersed in a boiling aqueous $H_2O_2$ solution. Conveniently, the solution was 30% by weight of $H_2O_2$, although 10–70% by weight of $H_2O_2$ would be appropriate. The device was immersed in solution until a layer of oxide a few hundred angstroms thick was grown on the exposed semiconductor surface area of the device. In this example, the device was removed from solution after 8 hours. A minimum thickness of 100 angstroms would be required in this step. For a 30% solution, therefore, an oxidation of at least 10 minutes is necessary. preferably, the device is then baked in a dry ambient such as nitrogen to remove excess water from the oxide. In this example, the device was held for 1 hour at 95°C, 2 hours at 150°C and then 2 hours at 250°C. In general, the device may be baked at successively increasing temperatures up to 150°–350°C for a period of ½ hour to 48 hours. The formation of this amorphous oxide and subsequent bake is described, for example, in U.S. Pat. application of R.L. Hartman-M. Kuhn-B. Schwatz, Ser. No. 239,708, filed Mar. 30, 1972 and assigned to the present assignee. In the first oxidation step of this invention, however, limitations are imposed due to the desire to maintain mirror surfaces as smooth as possible. It was discovered that the pH of the solution should be within the range 1.5–3.5 otherwise some pitting will occur. A 30% solution of $H_2O_2$ has a pH of approximately three. For other concentrations, where the pH may lie outside this range, the pH may be lowered by adding a source of hydrogen ions such as $H_3PO_4$ or $H_2SO_4$, or may be raised by adding a source of hydroxyl ions such as $NH_4OH$.

For the next step, however, a 30% solution of $H_2O_2$ was adjusted to a pH of 7 by the addition of approximately 1 ml concentrated $NH_4OH$ to 700 ml of solution. The device was immersed in this solution, hereinafter referred to as the PA solution, for approximately 15 minutes at room temperature. The critical feature of this aspect of the process is that the pH of the solution must be within the range 6–8. Thus, the solution may contain any source of hydroxyl ions. $NH_4OH$ is preferred since the cation will not contaminate the gallium arsenide material. Hydrogen peroxide concentration in this solution may also range from 10–70%. It is expected that the devices should be immersed in this pH adjusted peroxide for a period of 3 minutes–1 hour in order to form an adequate protective coating. Subsequent to this second oxidation, a second bake is preferably performed. Again, the device was baked in nitrogen for 1 hour at 95°C, 2 hours at 150°C and 2 hours at 250°C. This baking treatment may also be performed to temperatures of 150°–350°C for a period of ½ hour to 48 hours.

It was discovered that treating devices with the double oxidation technique above resulted in essentially complete protection against the deleterious effects of water. This is illustrated in the figure, which is a graph of normalized threshold current ($J_{th}(t)/[J_{th}(O)]$) as a function of time for four groups of GaAs double heterostructure devices under various conditions.

Curves 10, 11 and 12 illustrate the effect of immersion in water on the threshold current of three groups of devices. The threshold current is a measure of degradation since the more power that is required for lasing, the faster the devices will deteriorate and reach extinction. Curve 10 represents a group of devices which had been baked only prior to immersion in water. It can be seen that the threshold current increased approximately 33% after 20 hours of exposure. Curve 11 demonstrates the effect of immersion in water on a group of devices which were oxidized in boiling $H_2O_2$ solution (pH = 3) and then baked. It appears that the oxide formed by this single oxidation has protected the devices for a period of 20 hours. However, on exposure to water for a period in excess of 20 hours, the threshold current begins to increase. After 200 hours, the threshold current increases approximately 20%. Curve 12 represents the effect of water on a group of devices treated in accordance with the double oxidation technique described above. The threshold current of these devices remained constant even after 200 hours of exposure. Scanning electron microscope observations made on the three groups of devices showed severe etching of the mirror surfaces for the devices which were baked only (curve 10), reduced etching for the singly oxidized devices (curve 11), and insignificant etching of the mirror surfaces for the doubly oxidized devices (curve 12).

A fourth group of devices was treated by immersion in PA solution and a subsequent bake without the first oxidation step. The effect of this treatment and subsequent immersion in water on the threshold current is shown in curve 13. After 15 minutes of exposure to PA solution (without the first oxide formation), the threshold increases by a factor of 2, and scanning electron microscope photographs show a severe etching of the mirror surfaces. After subsequent immersion in water, the threshold remains fairly constant.

It may thus be concluded that while a single oxidation of GaAs lasers in boiling $H_2O_2$ solution with pH = 1.5–3.5 will provide partial protection against water, a double oxidation first in $H_2O_2$ solution and then in a PA solution will provide essentially complete protection against the degrading effects of water even over extended periods of time. This result is seen even though single oxidation of devices in PA solution alone causes severe degradation of the mirror surfaces.

The exact physical explanation of the above results is not entirely clear. It appears that when GaAs is oxidized by $H_2O_2$ solution alone or the PA solution alone, the basic reaction proceeds as follows:

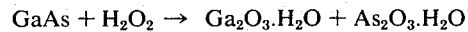

$$GaAs + H_2O_2 \rightarrow Ga_2O_3.H_2O + As_2O_3.H_2O \qquad (1)$$

In the case of $H_2O_2$ solution wherein pH<6, the arsenious oxide and gallium oxide form an amorphous mixture which provides a boundary for outside contaminants and thus protects the surfaces of the device. However, in the case of PA solution where pH = 6–8, a further reaction of the $As_2O_3.H_2O$ then proceeds in the water solvent thus:

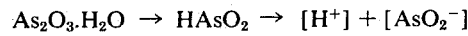

$$As_2O_3.H_2O \rightarrow HAsO_2 \rightarrow [H^+] + [AsO_2^-] \qquad (2)$$

which reaction is promoted by the neutrality (pH = 7) of the solvent. The result is a dissolution of most of the $As_2O_3.H_2O$ generated, which causes the etching of the mirror surfaces. On the other hand, when the PA solution is applied to a device which already has a layer of oxide formed by the $H_2O_2$ solution, the initially generated $As_2O_3.H_2O$ has already been bound up in a vitreous oxide and is prevented from passing into solution. Thus, the PA solution in this case causes an increased growth of the amorphous oxide and hence greater protection of the device. It will be understood that the above explanation is presented as a possible rationale for the effectiveness of the inventive method and is not intended as a limitation on the scope of the method as described.

Various additional modifications will become apparent to those skilled in the art. All such deviations which basically rely on the teachings through which the invention has advanced the art are properly considered within the spirit and scope of the invention.

What is claimed is:

1. A method of treating the mirror surfaces of a junction laser device comprising $Z_xGa_{1-x}As$ where $x = 0 - 0.7$ and Z is selected from the group consisting of Al and in order to provide a protective coating against ambient conditions without degrading the said mirror surfaces comprising growing an oxide layer on the surface of said device by immersing said device in a first aqueous solution comprising $H_2O_2$ wherein the pH of the solution is within the range 1.5–3.5, and immersing said device in a second aqueous solution comprising $H_2O_2$ and an amount of a pH modifier to give a pH of the second solution within the range 6–8.

2. The method according to claim 1 wherein the first solution is held at the boiling point of said solution.

3. The method according to claim 1 wherein the device is immersed in the first solution until an oxide at least 100 A thick is formed.

4. The method according to claim 1 wherein the first solution is approximately 30% by weight of $H_2O_2$.

5. The method according to claim 4 wherein the device is immersed in the first solution for a period of at least 10 minutes.

6. The method according to claim 1 further comprising baking said device subsequent to immersion in the first solution at successively increasing temperatures up to approximately 150°–350°C for a period of approximately ½ hour to 48 hours.

7. The method according to claim 1 wherein the second solution further comprises $NH_4OH$.

8. The method according to claim 1 wherein the second solution is approximately 30% by weight of $H_2O_2$.

9. The method according to claim 1 wherein the device is immersed in the second solution for a period of 3 minutes–1 hour.

10. The method according to claim 1 further comprising baking said device subsequent to immersion in the second solution at successively increasing temperatures up to approximately 150°–350°C for a period of approximately ½ hour to 48 hours.

* * * * *